UNITED STATES PATENT OFFICE.

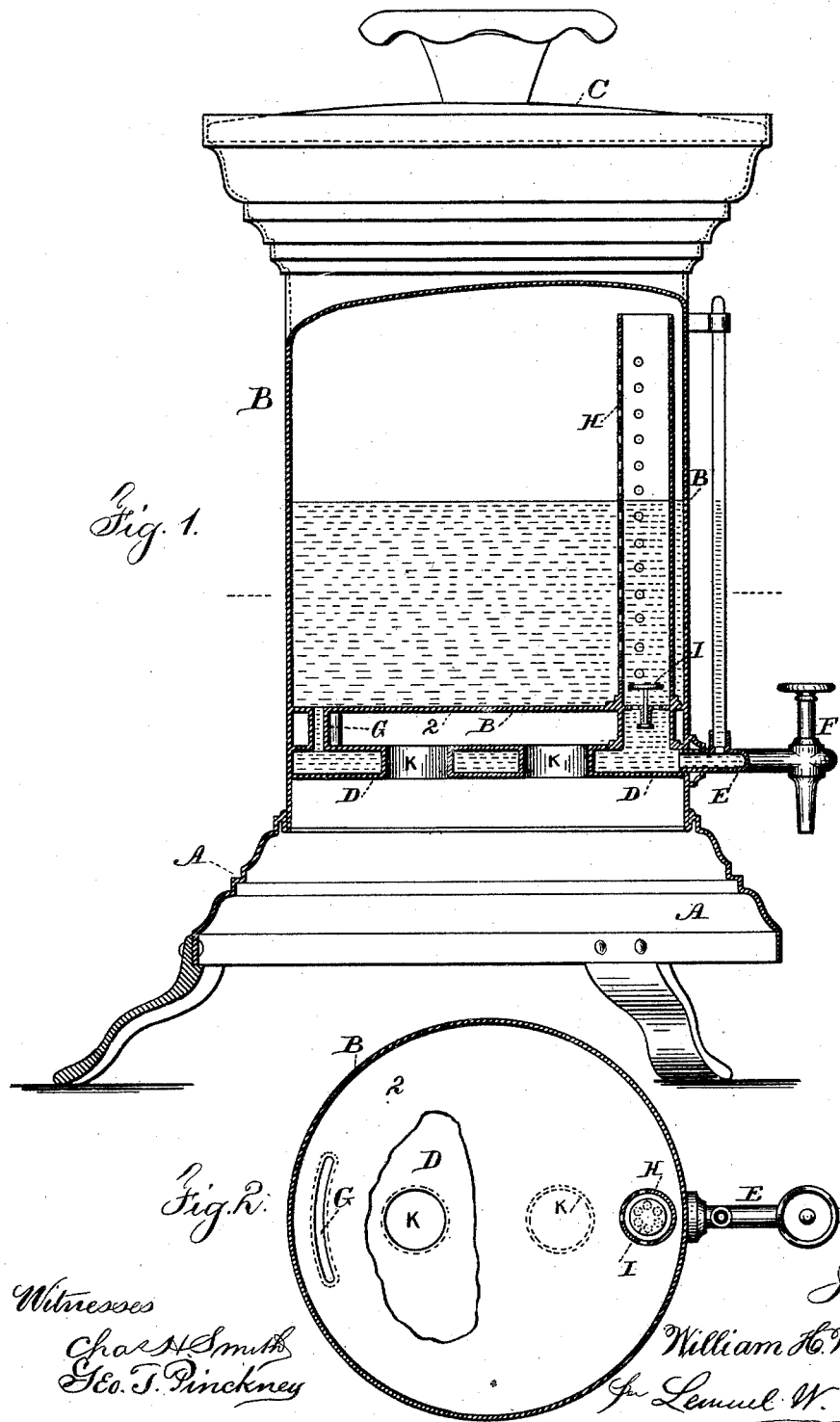

WILLIAM H. WILBUR, OF NEW YORK, N. Y.

APPARATUS FOR HEATING WATER, &c.

SPECIFICATION forming part of Letters Patent No. 468,124, dated February 2, 1892.

Application filed October 24, 1891. Serial No. 409,688. (No model.)

*To all whom it may concern:*

Be it known that I, WILLIAM H. WILBUR, a citizen of the United States, residing in the city and State of New York, have invented an Improvement in Apparatus for Heating Water, &c., of which the following is a specification.

Urns and heaters for water, coffee, &c., have been constructed with a double bottom, and the heat of a gas-flame or other source of heat has been employed below the bottom.

The object of the present invention is to provide for heating up a portion of the water with rapidity and continuing the application of the heat until the whole of the contents of the vessel are heated. By this means delay in heating up the whole of the contents of the vessel is avoided and a few cups of water, tea, or coffee are heated up with rapidity for immediate use and the heating operation is afterward continued.

In the drawings, Figure 1 is a vertical section of the water-heating apparatus, and Fig. 2 is a sectional plan view, partially broken open for illustrating the construction.

The base A is of any suitable character, and within it a gas or other burner is provided for heating, as usual. This, however, is not represented. Above the base A is a water-holding vessel B, of suitable size and shape, and C is a removable cover.

Below the vessel B and within the base A is a secondary heating-vessel D, preferably in the form of a flat or comparatively thin hollow cylinder, and from one edge of this secondary heater projects a pipe E and cock or faucet F, and there is a pipe G passing from the top of the secondary heater D through the bottom of the water-holding vessel B. This pipe is represented as elongated, and at the opposite side of the secondary heater from the faucet F and within the apparatus and at the side nearest to the faucet F is a pipe H, passing up from the secondary heater D, through the bottom of the water-holder B, and rising to a suitable height within such vessel B, and this pipe H is preferably open at the upper end and perforated with one or more lines of holes in the portion of the pipe within the water-holding vessel B, and there is a valve I, of any suitable construction, in the pipe H, opening upwardly.

It is to be understood that this apparatus is preferably made of sheet metal, with the joints soldered or otherwise rendered water-tight, and it is preferable to make use of flues K, in the form of pipes passing through the secondary heater D, for allowing the products of combustion to pass up through these flues and into the space between the bottom of the water-heating vessel B and the top of the secondary heater D.

Water, tea, coffee, or other liquid to be heated is introduced into the vessel B and runs through the pipes into the secondary heater D, so that the latter is entirely filled, and when the gas-burner is ignited beneath this secondary heater the water in the secondary heater becomes rapidly heated, because the heat surrounds the secondary heater and there is but a slight circulation up through the pipe H and down through the pipe G, because the valve I forms a slight obstruction to the circulation. Hence the water in the secondary heater D becomes highly heated with rapidity and can be drawn off to a greater or less extent by the faucet F, thereby giving a supply of hot water before the water in the vessel B is highly heated, and the heat acts below the water-holding vessel B to a greater or less extent upon the bottom 2 thereof, and the hot water in the vessel D rises past the valve I and flows upwardly through the pipe H into the vessel B and returns through the pipe G into the secondary heater D in order that the entire contents of the apparatus may eventually become of a uniform temperature, or nearly so; but under all circumstances when the faucet F is opened the outflow of water causes the valve I to close, so that the water is drawn principally from the secondary heater D, which is exposed to the most intense heat.

I claim as my invention—

1. The combination, with a vessel B, of a secondary heater below the same, a pipe and faucet at one side of the secondary heater, a pipe G, passing from the secondary heater through the bottom of the water-holding vessel, and the pipe H and valve I, adjacent to the faucet and connecting the secondary heater to the water-holding vessel, substantially as set forth.

2. The secondary heater made as a flat hollow sheet-metal vessel having flues passing through the same, in combination with a water-holding vessel beneath which the secondary heater is placed, a pipe and faucet extending out from one side of the secondary heater, the pipes G and H, connecting the secondary heater and the water-holding vessel, the pipe H rising within such water-holding vessel and being perforated, and a valve I in the pipe H, opening upwardly, substantially as set forth.

Signed by me this 22d day of October, 1891.

WILLIAM H. WILBUR.

Witnesses:
GEO. T. PINCKNEY,
WILLIAM G. MOTT.